United States Patent [19]

Beilfuss et al.

[11] Patent Number: 5,312,174

[45] Date of Patent: May 17, 1994

[54] SLIP-CONTROLLED BRAKE SYSTEM, ESPECIALLY FOR USE WITH AUTOMOTIVE VEHICLES

[75] Inventors: Hans J. Beilfuss, Hofheim/Ts.; Frank Goehring, Frankfurt am Main, both of Fed. Rep. of Germany; Michael Vogt, Rochester Hills, Mich.

[73] Assignee: Alfred Teves GmbH, Fed. Rep. of Germany

[21] Appl. No.: 17,461

[22] Filed: Feb. 12, 1993

Related U.S. Application Data

[62] Division of Ser. No. 635,162, Dec. 21, 1990, Pat. No. 5,209,554.

[30] Foreign Application Priority Data

Apr. 22, 1989 [DE]  Fed. Rep. of Germany ....... 3913352
May 6, 1989 [DE]  Fed. Rep. of Germany ....... 3914953

[51] Int. Cl.$^5$ .................... B60T 8/32; B60T 8/44; B60T 8/48; B60T 13/12
[52] U.S. Cl. .................... 303/116.1; 303/87; 303/119.1; 303/900
[58] Field of Search .......... 303/87, 116.1, 10-12, 303/119.1, 119.2, 900, 901, 113.1, 114.2, 114.1, 115.1, 116.2, 116.3, 116.4; 138/26, 30, 31; 181/233, 207; 188/152; 417/540, 534, 543, 313

[56] References Cited

U.S. PATENT DOCUMENTS

| | | |
|---|---|---|
| 2,495,693 | 1/1950 | Byrd, Jr. et al. . |
| 2,701,583 | 2/1955 | Rux . |
| 3,140,124 | 7/1964 | Heiland . |
| 3,331,398 | 7/1967 | Goss . |
| 3,495,880 | 2/1970 | Gratsch . |
| 3,753,598 | 8/1973 | Michellone et al. . |
| 4,121,686 | 10/1978 | Keller, Jr. . |
| 4,188,073 | 2/1980 | Ishikawa et al. . |
| 4,571,009 | 2/1986 | Jones . |
| 4,715,667 | 12/1987 | Otsuki et al. . |
| 4,778,222 | 10/1988 | Numata et al. . |
| 4,790,608 | 12/1988 | Burgdorf et al. . |
| 4,807,945 | 2/1989 | Budecker et al. . |
| 4,812,777 | 3/1989 | Shirai . |
| 4,840,436 | 6/1989 | Burgdorf et al. . |
| 4,919,495 | 4/1990 | Kircher et al. . |
| 4,952,002 | 8/1990 | Arikawa et al. . |
| 4,989,925 | 2/1991 | Kohno . |
| 5,020,864 | 6/1991 | Tanaka . |
| 5,031,969 | 7/1991 | Siegel . |
| 5,035,469 | 7/1991 | Geilen et al. . |
| 5,058,961 | 10/1991 | Mergenthaler et al. . |
| 5,094,599 | 3/1992 | Budecker . |
| 5,209,554 | 5/1993 | Beilfuss et al. ............... 303/119.1 X |

FOREIGN PATENT DOCUMENTS

| | | |
|---|---|---|
| 1924047 | 11/1970 | Fed. Rep. of Germany . |
| 2643860 | 3/1978 | Fed. Rep. of Germany . |
| 3301332 | 7/1984 | Fed. Rep. of Germany . |
| 3505410 | 8/1986 | Fed. Rep. of Germany . |
| 3700282 | 7/1987 | Fed. Rep. of Germany . |
| 3627264 | 2/1988 | Fed. Rep. of Germany . |
| 3717089 | 12/1988 | Fed. Rep. of Germany . |
| 3735238 | 4/1989 | Fed. Rep. of Germany . |
| 3807314 | 4/1989 | Fed. Rep. of Germany . |
| 3844246 | 7/1989 | Fed. Rep. of Germany . |
| 3904132 | 8/1990 | Fed. Rep. of Germany . |
| 3924085 | 1/1991 | Fed. Rep. of Germany . |
| 1106759 | 4/1989 | Japan . |
| 1197524 | 7/1970 | United Kingdom . |
| 2163503 | 2/1986 | United Kingdom . |
| 2196709 | 5/1988 | United Kingdom . |
| 2213222 | 9/1989 | United Kingdom . |

OTHER PUBLICATIONS

Bosch Technische Berichte, Band 7 (1980), Heft 2 (94 pages).

*Primary Examiner*—Douglas C. Butler
*Attorney, Agent, or Firm*—J. Gordon Lewis; Robert P. Seitter

[57] ABSTRACT

A slip-controlled brake system, especially for use with automotive vehicles has a brake pressure generator (1) accommodating a master cylinder (2) connected to the brake pressure generator through master brake conduits (62,63) are the wheel brakes (31 to 34), comprising hydraulic auxiliary pressure pumps (21,26) and wheel sensors (S1 to S4) and electronic circuits capable to control, for slip control purposed, electromagnetically actuable pressure fluid inlet valves (24,25,29,30) and pressure fluid outlet valves (22,23,35,36) provided in the pressure fluid conduits, with pressure pulsation attenuators (27) of a defined volume expansion and flow length being provided for noise reduction purposed during the control operation, between the master cylinder (2) and the wheel brakes (31 through 34).

9 Claims, 3 Drawing Sheets

SLIP-CONTROLLED BRAKE SYSTEM, ESPECIALLY FOR USE WITH AUTOMOTIVE VEHICLES

This is a divisional of copending application(s) Ser. No. 07/635,162 filed on Dec. 21, 1990, now U.S. Pat. No. 5,209,554.

The present invention relates to vehicle brake systems including slip control.

BACKGROUND OF THE INVENTION

Slip-controlled brake systems for use with automotive vehicles have previously been adequately described and are thus known in the art. DE-OS 35 05 410 already discloses a slip-controlled brake system comprising a master cylinder serving as a brake pressure generator and exhibiting a hydraulic brake force booster coupled thereto. The auxiliary pressure supply system includes a hydraulic pump supplying, in slip-controlled decelerating processes, after passing a number of check valves series-connected in the pressure fluid circuit, an auxiliary pressure in proportion to the pedal force, to the wheel brakes after opening of the inlet valves electromagnetically excitable by means of an electronic control unit. This pressure modulated by the dynamic pump frequency and the switch frequency, through the fluid and the vibratory conduit system, is transmitted to the master cylinder such that, in particular, in response to the switch frequency of the inlet and outlet valves, all mass-loaded parts associated to the brake system which, as a consequence, constitute a vibratory structure under consideration of the specific self-oscillation number, tend to build up resonant vibrations. Apart from the additional mechanical strain on the brake system to be considered thereby, as a result of pressure pulses of varying intensity, a noise level, in some instances considered disturbing, is to be deemed a disadvantage involved with the state-of-the-art brake system.

BRIEF DESCRIPTION OF THE INVENTION

It is, therefore, the object of the invention to improve a slip-controlled hydraulic brake system to the extent that the above-described disadvantageous development of audible noise, as a result of the pressure pulsation caused by non-steady flows, is minimized, at the same time permitting a cost-reducing modification of the brake system and the conventional mechanical construction to be almost maintained.

This problem, in the practice of the invention, is solved by providing a slip-controlled brake system characterized by a comparatively simple integration of elastomeric pressure pulsation attenuators located between the valve means and the master cylinder of the hydraulic system.

According to an advantageous form of embodiment of the invention, the energy storing element is made of heterogeneous materials so that, thanks to the combination of different material properties, the degree of deformation can be fixed in response to the hydraulic application of pressure, thereby enabling, for example, a degressive rise in pressure to be realized so that the increased volume of the hydraulic circuit, during non-controlled normal deceleration, is minimized as far as possible.

The use of a natural caoutchouc or rubber serving as a raw material for manufacturing and refining a plastic-type elastomeric material core will permit, in simple and inexpensive manner, the desired property of the energy storage element to be attained, with an adequate rigidity in the overall compound of the body being insured through enclosing the material core by means of a fiber-reinforced envelope.

Additional features, advantages and capabilities of end-use application of the invention will become manifest from the dependent claims and from the following description of a plurality of forms of embodiment showing schematically the hydraulic circuiting logistics along with a structurally suitable form of embodiment for the integration of pressure pulsation attenuators in the brake systems.

The detailed description of the disclosed embodiments makes reference to the accompanying drawings.

DETAILED DESCRIPTION OF THE PREFERRED AND ALTERNATIVE EMBODIMENTS OF THE INVENTION

Figure 1:
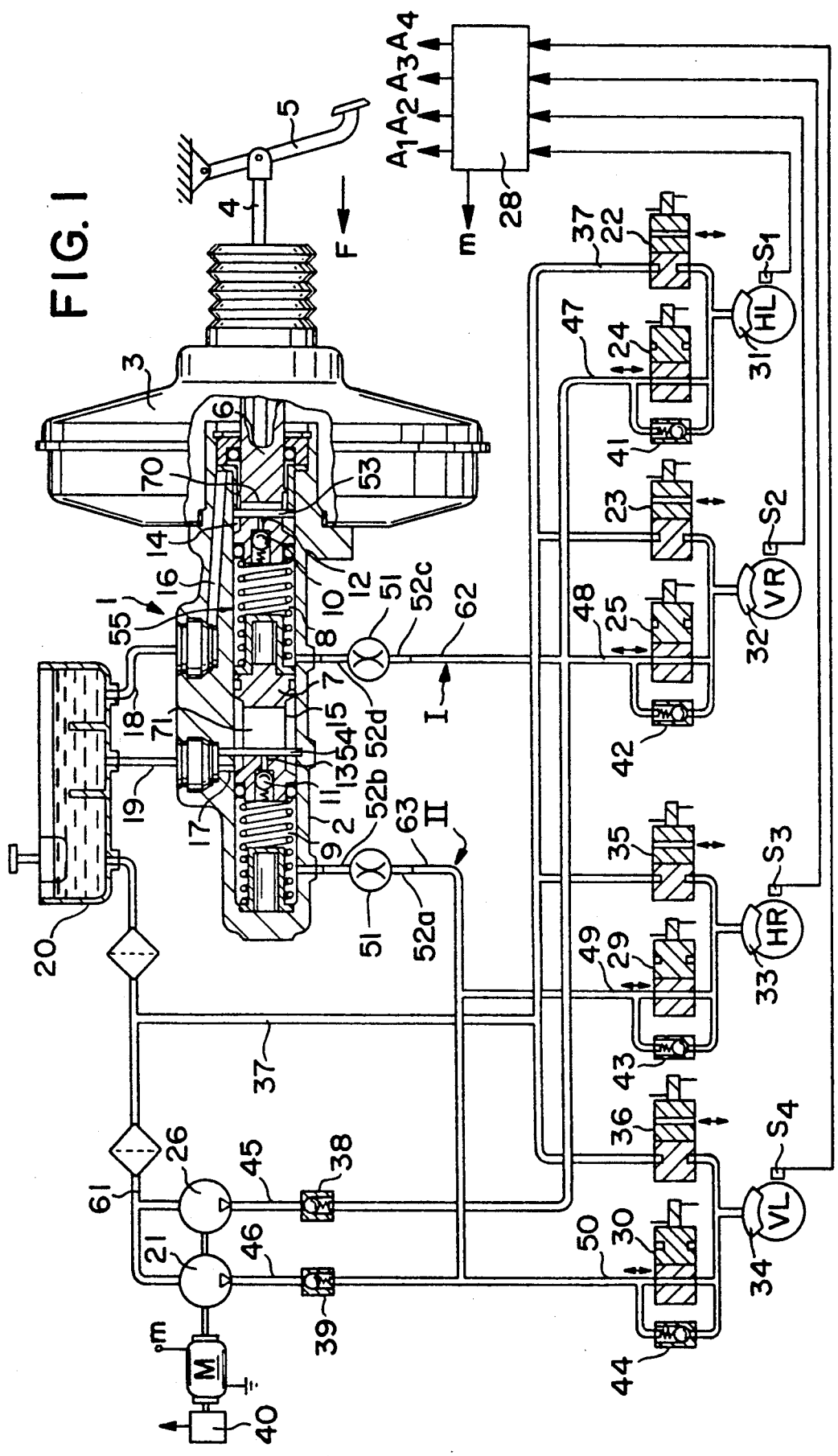
FIG. 1 shows the hydraulic circuit of the slip-controlled brake system including the pressure pulsation attenuators directly coupled to the master cylinder.

In the example of embodiment as shown in FIG. 1, the brake system according to the invention, substantially, comprises a tandem master cylinder 2 and a vacuum booster 3 coupled thereto, the hydraulic assembly and the brake force generator 1, respectively. The pedal force F exerted on brake pedal 5, through a push rod 4, in known manner, is transmitted to the vacuum booster 3 from where, in manner supported by auxiliary force, it is transmitted to the working pistons 6 and 7 of the tandem master cylinder 2.

In the brake releasing position as shown, the pressure chambers 8,9 of the master cylinder 2, through open central control valves 10,11 connecting passageways 12,13 within the interior of the pistons 6,7 and through annular chambers 14,15, connecting ports 16,17 and through hydraulic conduits 18,19 are in communication with a pressure equilibrium and pressure fluid reservoir 20.

The two brake circuits I and II, through an elastomeric pressure fluid connection consisting of two high-pressure hoses 52a, b, c, d with diaphragm members 51 integrated therein and, hence, being associated to each of the brake circuits I, and II, and though electromagnetically actuable inlet valves 24,25 and 29,30, respectively, which, in the basic position, are switched to passage, are in communication with the wheel brakes 31,32,33,34. The wheel brakes 31,32 and 33,34, respectively, connected in parallel, are associated to the diagonals.

The wheel brakes 31,32,33,34 are connected to electromagnetically actuable outlet valves 22,23 and 35,36, respectively, blocked in the basic position and communicating, through hydraulic return conduit 37, on the one hand, with the pressure equilibrium reservoir 20 and, on the other hand, though the intake conduit 61, with the suction sides of pumps 21, 26 furnished with a driving motor "M". The electrical connections "m" to mass, equally, are schematically shown. Moreover, a monitoring circuit 40 is provided which is capable to monitor the way of operation of the motor "M". The wheels of the automotive vehicle are provided with inductive sensors S1 to S4 cooperation with a rack disc engaged in synchronism with the wheel rotation and generation electric signals identifying the wheel rotating pattern, i.e. the change in the wheel speed. Such signals, through inlets S1 to S4, are fed to an electronic control unit 28 generating brake pressure control signals by way of which, during identifying a locking tendency, the inlet and outlet valves 22,23,24,25 and 29,30,35,36 temporarily reswitch, thereby keeping constant, decreasing and reincreasing the brake pressure in due time. The actuating magnets of the inlet and outlet valves, through outlets A1 to A4, are thereby actuated and establish the electrical connecting conduits between the connections A1 to A4 and the winding of the valves 22,23,24,25 and 29,30,35,36 not shown in any closer detail.

The switch-on signal for putting into operation the driving motor "M" of the hydraulic pump 21, 26 required to be operative during a slip control, is applied through connection "m" to the motor "M".

Figure 2:
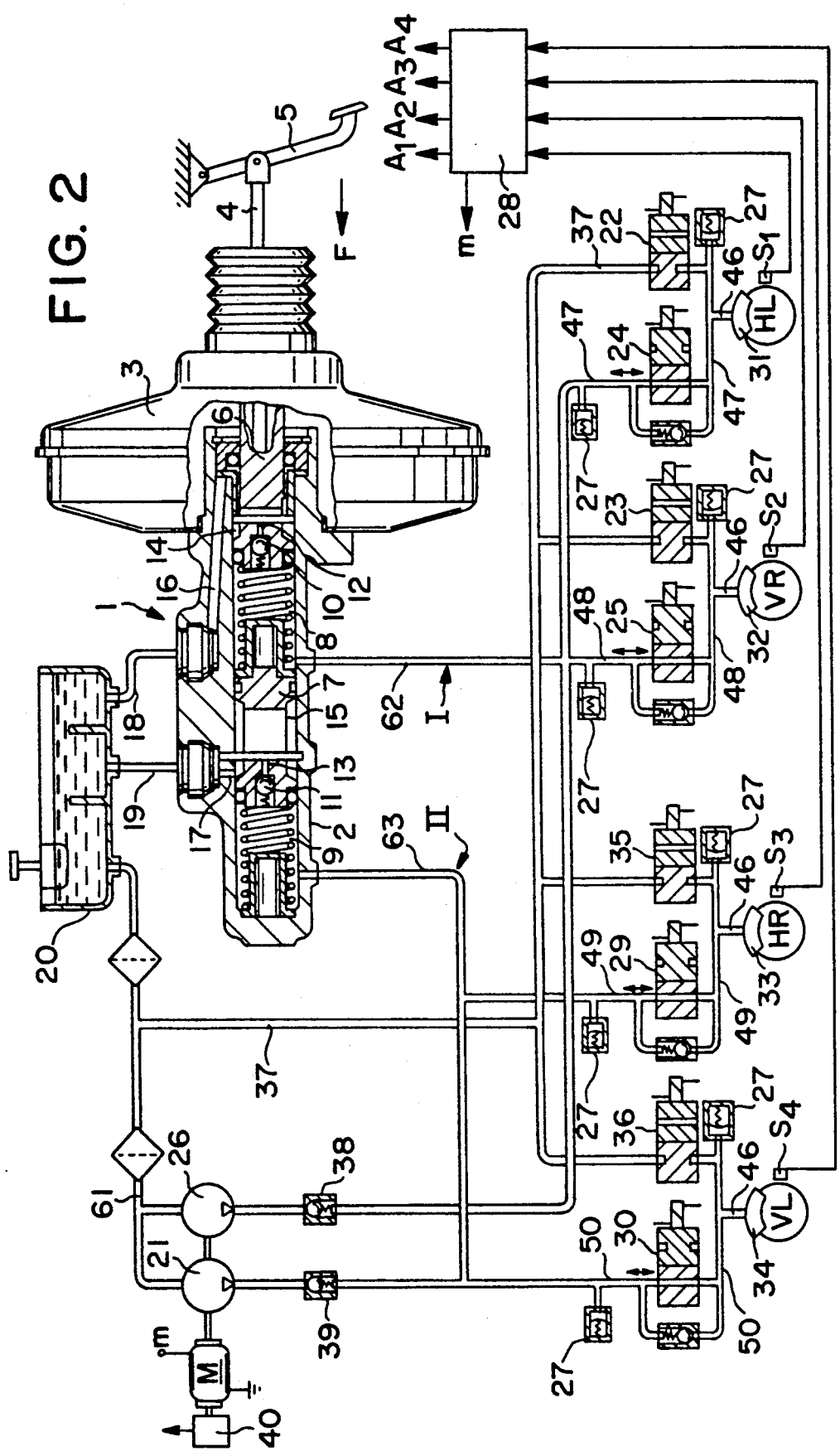
FIG. 2 schematically shows the arrangement of the energy storing element according to the invention within the hydraulic circuit between the auxiliary pressure pumps and the valve means.

FIG. 2 schematically shows a hydraulic circuit identical with that of FIG. 1 so that, in analogy to FIG. 1, the two brake circuits I and II of the master cylinder 2, through electromagnetically actuable inlet valves 24,25 and 29,30, respectively switched, in the basic position, to passage, are in communication with the wheel brakes 31,32,33,34, with the vibration-damping elastomeric energy storing element 27 according to the invention, as opposed to the illustration of FIG. 1, being respectively located in the direct vicinity of the inlet and outlet valves 24,25,29,30,22,23,35,36 to the pressure side of which pressure is hydraulically applied in shunt with the branch conduits 47,48,49,50.

Operation Of The Brake System According To FIG. 1.

With the brake applied, the pedal force F, supported by the vacuum in the booster 3, is transmitted to the master cylinder piston 6,7. The central control valves 10,11 close so that brake pressure can now develop within the pressure chambers 8,9 and, hence, within the brake circuits I, II, which pressure is passed, through a diaphragm body 51 respectively disposed in an elastomeric pressure fluid connection, to the valves 24,25 and 29,30, respectively, and to the wheel brakes 31,33 and 33,34, respectively.

Once a locking tendency is identified on one or several wheels with the aid of the sensors S1 to S4 and the circuit 28, the slip control will commence. The driving motor "M" of pump 21,26 is actuated, thereby causing a dynamically pulsating pressure to develop in two inlet conduits which is in proportion to the pump rotating frequency acting as an energizing frequency through check valves 38,39 and branch conduits 47,48 and 49,50, respectively, on the inlet valves 24,25 and 29,30, respectively, and on pressure chamber 8,9 of the master cylinder 2. By providing an elastomeric pressure fluid connect formed as a short high-pressure tubular section 52a, b, c, d in master brake conduits 62,63 in the vicinity of the master cylinder 2, the pulsating and, hence, the non-steady pressure source, as a result of the volume expansion of the elastomeric tubular sections, will first be subject to an attenuating effect resulting in a reduced amplitude, with a non-steady phase-shifted carrier wave, in reacting pressure energy to kinetic energy, being left in the oscillatory circuit while adapting the diaphragm body 51 to the energizing frequency in proportion to the pump rotating frequency. The elastomeric pressure fluid connection may have a volume expansion which does not exceed 3 mm$^3$ per bar pressure unit. The elastomeric pressure fluid connection may also have a storage volume which does not exceed 1 cm$^3$ per meter tube length and its length may be not in excess of 1.5 cm. The resultant modified sound propagation speed precludes the occurrence of interferences so that the sum of the amplitudes of the individual waves, according to tendency, remains small. In any case, the adaptation of the elastomeric pressure fluid connection to the diaphragm body has to be effected in manner that the higher sensitive frequency range of between 16 and 20.000 Hz can be based on a sound pressure level as low as possible.

A signal of the electric control unit 28 results in the switch-over of the electromagnetically acutable inlet valves 24,25 and 29,30, respectively, and, hence, in blocking the brake circuits I and II and the branch conduits 47 to 50, respectively, with interfering frequencies, in response to the propagation speed of the pressure waves, being likely to additionally contribute to the noise formation. The additional displacement of the master cylinder pistons 6,7 toward the pedal force F, and an evacuation of the pressure chambers 8,9 are precluded as the pressure fluid from the pumps 21,26 through the supply conduit, opened check valves 38,39 and master brake conduits 62.63, tends to flow in pulsating manner into the pressure chambers 8,9 to force back the pistons 6,7 into their initial position. However, by providing the elastomeric pressure fluid connections 52a, b, c, d and the diaphragm bodies 51; a pressure wave attenuating effect takes place so that noise can, at the same time, be reduced. The pressure pattern in the wheel brakes 31 to 34 is fixed by the inlet and outlet valves 24,25,29,30 and 22,23,35,36, respectively, to which additional slip-controlled brake pressure control signals can be supplied through the connections A1 to A4.

As revealed by the drawings, the inlet valves 24,25 and 29,30, respectively, are additionally locked by check valves, switched in parallel. Such check valves, in special cases, permit a termination of the brake pressure control and a release of the wheel brakes, respectively, as, with the inlet valves 24,25 and 29,30, respectively, and outlet valves 21,23 and 35,36, respectively, still closed, a small amount of pressure fluid form the wheel brakes 31 to 34 can flow back into the pressure chambers 8,9 once the pistons 6,7 of the master cylinder 2 are forced back into the initial position and the central control valves 10,11 are in the open position.

Operation Of the Brake System According To FIG. 2

As already conveyed by the function description of FIG. 1, with the brake applied, the pedal force F, supported by the vacuum in booster 3, is transmitted to the master cylinder pistons 6,7. The central control valves 10,11 will close such that brake pressure can now develop within the brake chambers 8,9 and, hence, within the brake circuits I and II, with the brake pressure, through valves 24,25 and 29,30, respectively, being passed to the wheel brakes 31,32 and 33,34 respectively.

Once a locking tendency is identified on one or several wheels, the slip control will commence in known manner. The driving motor M of pumps 21,26 will be activated, with dynamic though pulsating pressure developing in the two inlet conduits, which pressure, thorough check valves 38,39 and branch conduits 47,48 and 49,50, respectively, will act on the inlet valves 25,26 and 39,30, respectively. By providing energy-storing elements 27 in the branch conduits 47,48 and 49,50, respectively, the pulsating and, hence, non-steady pressure wave, as a result of the volume expansion, is subject to an attenuating effect.

Figure 3:
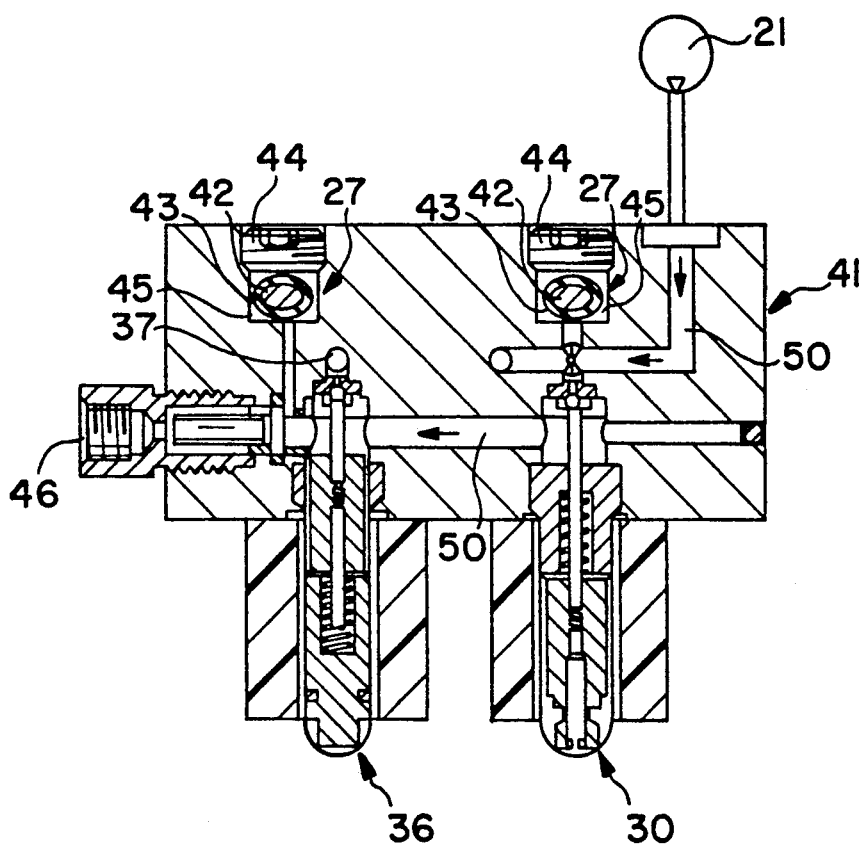
FIG. 3 shows the structural integration of energy storing elements within a valve block connected to the auxiliary pressure supply.

Reswitching of the inlet valves 24,25 and 39,30, respectively, and of the outlet valves 22,23 and 35,36, respectively, equally results in excessively pulsating pressure fluctuations in the pressure fluid conduits so that the vibration-attenuating elastomeric energy-storing elements 27 provided therein, in the immediate vicinity of the valves to which pressure is applied, are subject to a pressure-responsive deformation resulting at the same time in a pressure wave-attenuating minor volume expansion of the hydraulic system. The energy-storing element may increase the volume of the pressure fluid conduits to a maximum of 2 mm$^3$ per bar pressure. Referring to FIG. 3, a body preferable of an elliptical configuration suitable serves as an energy-storing element 27 the material core 42 of which exhibits a high flexibility, with the envelope 43 enclosing the material core 42 being made of a high-density and high-rigidity material exhibiting elastic deformation properties so that thanks to the adaptation between material core 42 and envelope 43, it will be possible for and energy-storing element 27 of a defined deformation to be provided such that a degressive characteristic can be imposed to the non-steady pressure pattern, thereby first precluding, at low brake pressures and, hence, at a low noise level, a deformation of the energy-storing element 27 from occurring to avoid, in advantageous manner, an additional volume increase in the hydraulic system. It is only at high pressures that a desired and defined deformation of the energy-storing element 27 takes place for the purpose of noise attenuation. The disadvantages effect of the variable volume increase at high pressures is to be deemed negligible.

FIG. 3 shows the structural arrangement of the two elastomeric energy-storing elements 27 in the branch conduits 47 to 50 connected to the pumps 21,26, with the sectional view of the inlet and outlet valves 22 to 25,29,30,35,36 combined to form a valve block 41 as shown, illustrating only, by way of example, the inlet valve 30 and the outlet valve 36 as demonstrated in FIG. 2.

Located adjacent the branch conduit 50, respectively on the pressure side in association with the inlet valve 30 and the outlet valve 36, are the energy-storing elements 27. The energy-storing elements 27, in the preferred form of embodiment, are in the form of spherical elements, with the soft material core 42 being surrounded by an envelope 43 of a high-density and high-rigidity material such that in the event of a pressure being applied to the branch conduits 50, in response to the actuation of the inlet valve 30 or the outlet valve 36, the energy-storing element 27 respectively disposed hydraulically in chamber 45 sealed by a screw 44, ensures, with pressure applied, a defined deformation and volume increase of the hydraulic system before a return flow, for example through return conduit 37, to the storage reservoir 20, or before an in-flow into the wheel connection 46 as shown, takes place.

The adaptation between the attenuating elements disposed ahead of the outlet valves also can be so effected as to cause a linearization of the pressure increase and pressure decrease gradients throughout a broad pressure range. In automotive vehicles having a high locking pressure level (>100 bar), the hydraulic pressure, throughout a broad pressure range, remains constant during the pressure rise and pressure drop per valve pulse.

We claim:

1. A slip-controlled brake system for automotive vehicles, having wheels and wheel brakes, said system comprising a pedal-actuated brake pressure generator supported by auxiliary force and accommodating a master cylinder connected to which, through pressure fluid conduits, are the wheel brakes, exhibiting hydraulic auxiliary pressure pumps and wheel sensors and electronic circuits for determining wheel rotational behavior and for generating electric brake pressure control signals for controlling electromagnetically actuatable pressure fluid inlet valves and outlet valves provided in the pressure fluid conduits for slip control purposes, characterized in that located in the pressure fluid conduits between the master cylinder and the inlet and outlet valves are pressure pulsation attenuators, each including two high pressure elastomeric tubular sections with a diaphragm member integrated between, which are deformable in response to hydraulic pressure fluctuations for attenuating pressure fluctuations from the hydraulic auxiliary pressure pumps and from the inlet valves and the outlet valves.

2. A slip-controlled brake system according to claim 1, characterized in that the pressure pulsation attenuators are provided between the pressure fluid conduits connecting the master cylinder to the hydraulic auxiliary pressure pumps, in the immediate vicinity of the master cylinder.

3. A slip-controlled brake system according to claim 2, wherein each of the high pressure elastomeric tubular sections has a storage volume which does not exceed 3 mm$^3$ per bar pressure unit.

4. A slip-controlled brake system according to claim 1, wherein each of the high pressure elastomeric tubular sections has a storage volume which does not exceed 1 cm$^3$ per meter tube length.

5. A slip-controlled brake system according to claim 1, wherein each of the high pressure elastomeric tubular sections has a length which does not exceed 1.5 cm.

6. A slip-controlled brake system according to claim 1, wherein the pressure pulsation attenuators have a degree of deformation which causes a degressive pressure rise and a progressive pressure drop in the wheel brakes.

7. A slip-controlled brake system for a vehicle having wheels, said system comprising:
a pedal-actuated brake pressure generator;
means for sensing wheel rotational behavior of said wheels and for generating signals representative of said wheel rotational behavior;
electronic circuit means, responsive to said signals representative of said wheel rotational behavior, for generating actuating signals;
hydraulic valves responsive to the actuating signals and operable to modulate brake pressure to effect wheel slip control;
an auxiliary pressure pump for delivering pressure fluid to said hydraulic valves during wheel slip control;
a hydraulic circuit interconnecting said generator and said hydraulic valves and said auxiliary pressure pump; and pressure attenuation means, which are:
- (a) displaceable in response to hydraulic pressure fluctuations,
- (b) disposed in said hydraulic circuit in the vicinity of said generator, and
- (c) operable to attenuate pressure pulsations within said hydraulic circuit caused by said hydraulic valves and caused by said auxiliary pressure pump, wherein said pressure attenuation means include two high pressure elastomeric tubular sections with a diaphragm member integrated between.

8. The slip-controlled brake system of claim 7, wherein displacement of said pressure attenuation means effects a momentary change in circuit hydraulic volume.

9. The slip-controlled brake system of claim 7, wherein displacement of said pressure attenuation means effects a momentary change in circuit hydraulic flow length.

* * * * *